United States Patent [19]
Fannin

[11] 3,920,274
[45] Nov. 18, 1975

[54] TELESCOPING ENERGY ABSORBING UNIT

[75] Inventor: Wayne V. Fannin, Xenia, Ohio

[73] Assignee: General Motors Corporation, Detroit, Mich.

[22] Filed: Jan. 23, 1975

[21] Appl. No.: 543,424

[52] U.S. Cl. .................. 293/70; 213/223; 267/139; 293/89
[51] Int. Cl.² ...................... B60R 19/02; F16F 9/06
[58] Field of Search .............. 293/1, 60, 63, 70, 73, 293/85, 89, DIG. 2; 267/64 R, 64 A, 116, 139; 213/43, 223; 188/269, 279, 280, 284, 311, 313, 314, 315, 317

[56] References Cited
UNITED STATES PATENTS

| | | | |
|---|---|---|---|
| 3,147,966 | 9/1964 | Axthammer et al. | 267/64 R |
| 3,700,273 | 10/1972 | Jackson et al. | 267/139 X |
| 3,794,310 | 2/1974 | Mewhinney | 267/139 |
| 3,814,219 | 6/1974 | Fannin et al. | 267/116 X |
| 3,820,771 | 6/1974 | Kerr et al. | 293/89 X |

Primary Examiner—M. Henson Wood, Jr.
Assistant Examiner—Andres Kashnikow
Attorney, Agent, or Firm—Charles R. White

[57] ABSTRACT

A telescoping energy absorbing unit having an inner cylinder with an end cap is slidably mounted in an outer cylinder and cooperates therewith to form a pair of hydraulically connected variable-volume chambers containing a hydraulic fluid. On predetermined impact causing the inner cylinder to telescope inwardly from an extended position, flow of hydraulic fluid from a first chamber to a second chamber is controlled by a fluid amplifying orifice element so that there is predetermined force resistance or energy absorption provided by the unit. A gas spring is employed to return the cylinders to an extended position after impact. Hydraulic fluid bled through a flow control orifice in a flap valve from the second chamber to the first chamber reduces the rate of recovery of the cylinders to their extended position.

4 Claims, 8 Drawing Figures

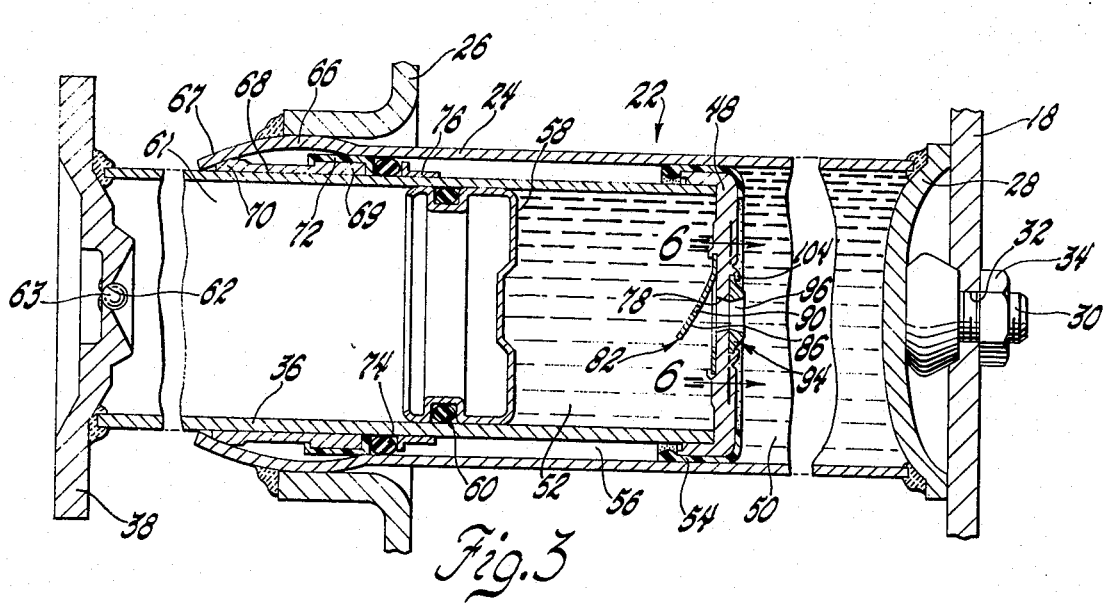
Fig. 3
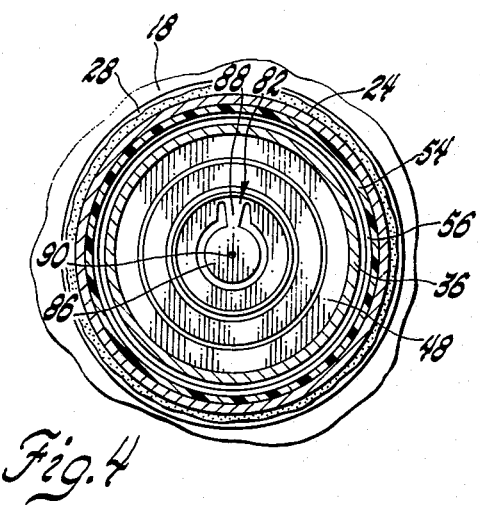
Fig. 4
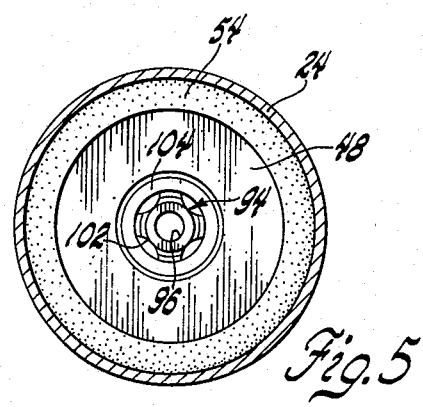
Fig. 5
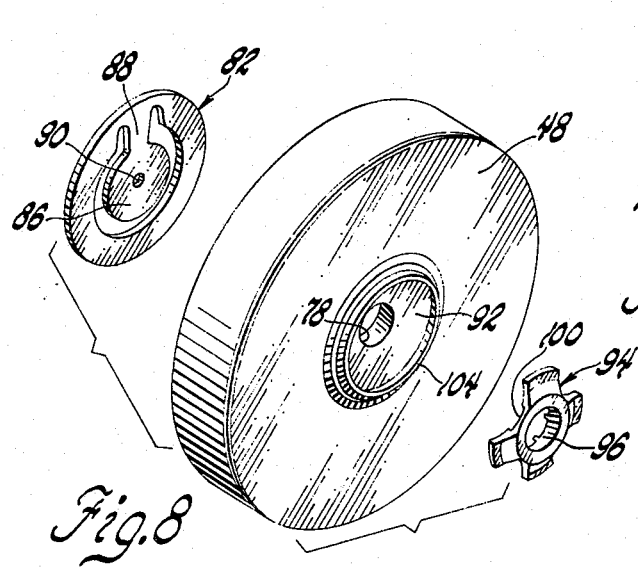
Fig. 8
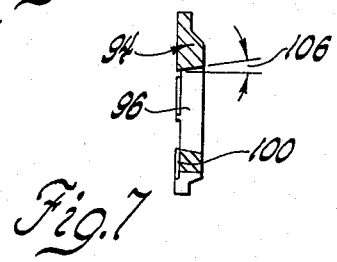
Fig. 6
Fig. 7

TELESCOPING ENERGY ABSORBING UNIT

This invention relates to energy absorbers and more particularly to a self restoring energy absorber having telescoping cylinders forming a pair of hydraulically interconnected chambers filled with hydraulic fluid and featuring new and improved valve devices for transferring the hydraulic fluid between the chambers during an energy absorbing stroke and a recovery stroke.

Prior to the present invention telescoping energy absorbers of the hydraulic type have been effectively employed to connect a vehicle impact bumper to the frame or other support structure of a vehicle. In one prior absorber unit incorporating inner and outer telescoping cylinders, an elongated metering pin is employed to gradually restrict an orifice hydraulically connecting variable volume pressure chambers in the unit when absorbing impact energy. The gradually restricted orifice provides for progressively increasing fluid resistance to the inward telescoping movement and the maintenance of a substantially constant pressure in a contracting chamber. This results in a generally square wave force vs deflection curve well-known to those skilled in this art. While such units are widely employed and have been highly effective in their use alternate designs are desired to provide for reduction in cost and weight.

In this invention, prior art metering pin construction is effectively replaced by small lightweight fluid amplifying device which can be readily manufactured at a reasonable cost. This fluid amplifying device can be easily incorporated in available energy absorbing unit constructions employing telescoping cylinders forming a pair of variable volume hydraulic chambers interconnected by an orifice. The fluid amplifying device of this invention preferably maintains substantially constant pressure in one of the hydraulic fluid chambers as it contracts by reducing the flow into an expanding chamber as velocity decreases so that a uniform resistance force is provided. After the unit is telescoped to a point where impact energy is dissipated, a spring force urges fluid from this second chamber to the first chamber for extending the cylinders back to their original position. A bleed orifice and valve means controls the return of this flow to reduce the rate of this recovery.

In a preferred embodiment of this invention an inner cylinder is telescopically mounted in an outer cylinder. The inner cylinder has a cap fixed on the inner end thereof that slides in the outer cylinder and provides for two variable volume chambers which are filled with a quantity of oil or other suitable hydraulic fluid. The cap has a centralized opening therethrough which hydraulically interconnects the two variable volume chambers. A fluid amplifying device is secured to the outer face of the cap and has a primary orifice axially aligned with the central opening in the cap. Control passages in the form of radial grooves are provided on an inner face of the fluid amplifying device to provide a 360° control input of hydraulic fluid into flow exiting into the central opening of the cap during the energy absorbing stroke. The flow through the fluid amplifying device is decreased with decreasing velocity of the telescoping cylinders providing for the maintenance of a constant pressure in the outer chamber so that the resistance and energy absorption is substantially constant. A gas spring compressed on the energy absorbing stroke of the unit provides a force on the fluid which urges the telescoped cylinders to an extended position. A flap valve closes at the beginning of recovery and a small bleed orifice meters fluid from the inner chamber to the outer chamber so that the rate of return or recovery of the telescoped cylinders to their extended position is reduced. The telescoping cylinders are slidably connected in a manner so that they form a unit sufficiently strong to suspend a bumper assembly to a vehicle body and permit the effective towing and jacking of the vehicle body.

Another feature, object and advantage of this invention is to provide a telescoping energy absorbing unit for mounting a bumper assembly to a vehicle in which there is a centralized flow passage that connects variable volume chambers filled with a predetermined quantity of oil which incorporates flow control means to control flow between the chambers on an energy absorbing stroke to maintain a predetermined resistance to impact force and further incorporating valve means to decrease the rate of flow between the chambers on the rebound stroke to reduce the speed of recovery.

Another feature, object and advantage of this invention is to provide a telescoping energy absorbing unit employing a new and improved fluid amplifying device which eliminates the metering pin and other prior art mechanical devices for gradually reducing orifice opening during an energy absorbing stroke and to further provide an effective unit to mount a bumper assembly to a vehicle.

Another feature, object and advantage of this invention is to provide a new and improved telescoping energy absorbing unit for vehicle bumpers movable from an extended position to a collapsed position in an energy absorbing mode of operation which provides a sufficiently rigid construction to withstand the vibration of rough road vehicle operation as well as the forces applied to the bumper during jacking or towing of the vehicle.

Another feature, object and advantage of this invention is to provide a new and improved telescoping energy absorbing unit which provides for a reduction in weight and cost and which effectively absorbs the energy of a predetermined impact applied to the unit.

These and other features, objects and advantages of this invention will becomes more apparent from the following detailed description and drawing in which:

FIG. 3 is a view similar to FIG. 2 which illustrates the energy absorber unit in a telescoped position after bumper impact;

FIG. 4 is a cross-sectional view taken generally along the plane indicated by lines 4—4 of FIG. 2;

FIG. 5 is a cross-sectional view taken generally along the plane indicated by lines 5—5 of FIG. 2; and FIG. 6 is a cross-sectional view taken generally along the plane indicated by lines 6—6 of FIG. 3;

FIG. 7 is a cross-sectional view taken generally along the plane indicated by lines 7—7 of FIG. 6;

FIG. 8 is an exploded perspective view of a cylinder cap assembly used in the energy absorber unit of this invention.

Figure 1:
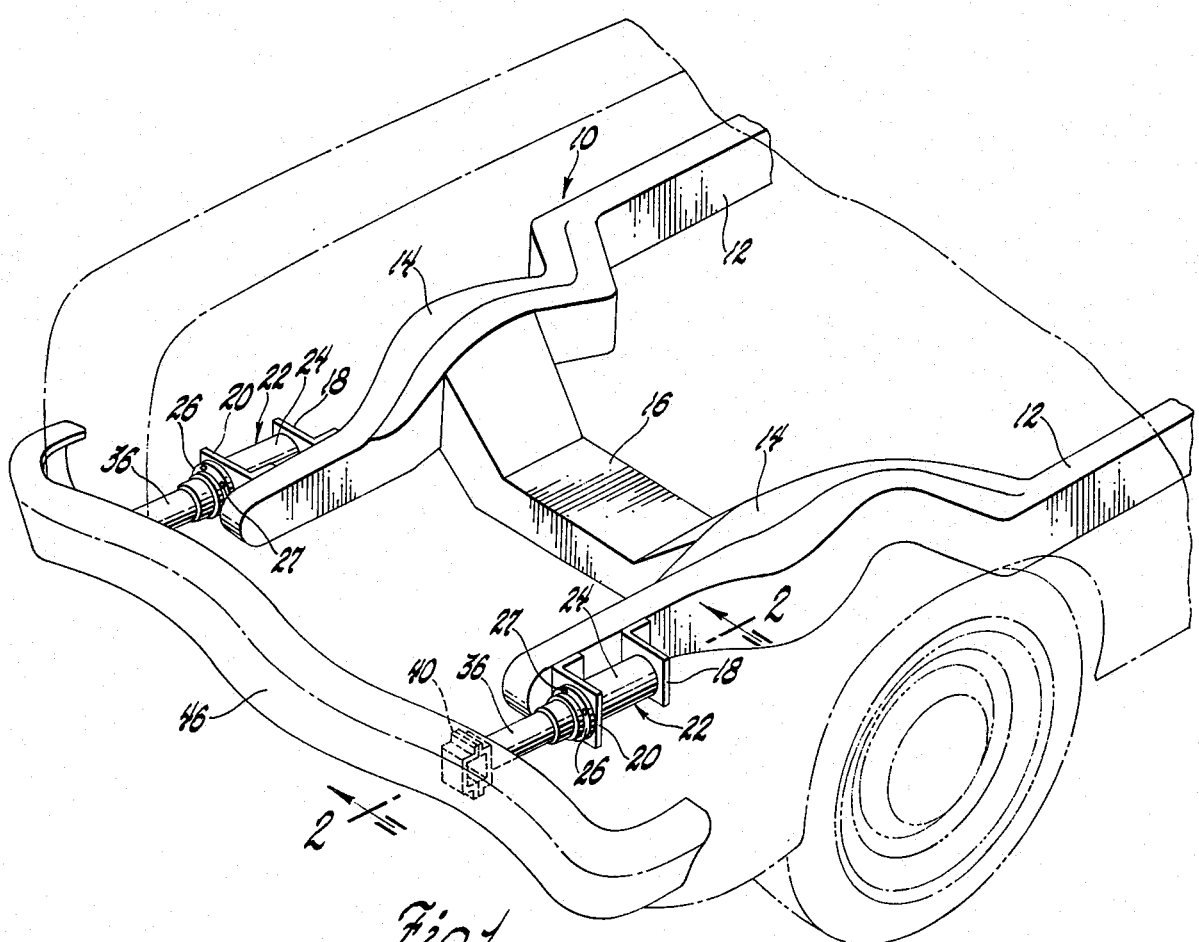
FIG. 1 is a perspective view of an automotive vehicle chassis frame and a pair of energy absorber units mounting a bumper assembly to the frame.

Referring now particularly to FIG. 1 of the drawings there is a vehicle chassis frame 10 comprising a laterally spaced pair of side rails 12 having forwardly extending horn portions 14 interconnected by a front cross member 16. Bolted to each horn portion are a pair of L-shaped brackets 18, 20 that connect spaced energy absorber units 22 to the chassis frame 10. Each energy absorber unit 22 has an outer cylinder 24 that extends through a circular opening in its associated bracket 20. A connector bracket 26 welded to the outer cylinder 24 is secured by threaded fasteners 27 to bracket 26. The outer cylinder 24 is closed by an end cap 28 that has a centrally threaded stud 30 fixed thereto that extends axially and outwardly through a circular opening 32 in bracket 18. Nut 34 threaded onto stud 30 secures the outer cylinder 24 to bracket 18.

In addition to the outer cylinder 24, each energy absorber unit 22 comprises an inner cylinder 36 which is mounted for limited telescoping movement within cylinder 24 and which projects forwardly therefrom. The forward end of the inner cylinder 36 is closed by a base plate 38 that is connected to a bumper bracket 40 which is secured by suitable fastener means, not shown, to a front bumper assembly 46. Secured to the inner or rearward end of the inner cylinder 36 is a cylinder cap 48 which defines first and second variable volume fluid chambers 50 and 52 each filled with a suitable hydraulic fluid such as oil. A bearing sleeve 54 of suitable material such as glass filled nylon is mounted over the peripheral edge of the cylinder cap 48 to slidably fit the inner diameter of outer cylinder 24. There is, however, a sufficient clearance between the bearing sleeve 54 and the inner walls of cylinder 24 so that chamber 50 is in direct hydraulic communication with an innerspace 56 formed between the outer and inner cylinders. Disposed within the inner cylinder 36 is a floating sheet metal piston 58 fitted with an O-ring 60 that separates chamber 52 from a front chamber 61 formed between the floating piston 58 and the base plate 38. A quantity of gas is compressed in chamber 61 being injected through an orifice 62 formed into base plate 38 which is subsequently sealed by a ball 63 welded therein. The force of the gas compressed within the chamber 61 urges the inner cylinder 36 in a forward direction to the normal extended position shown in FIG. 2.

Figure 2:
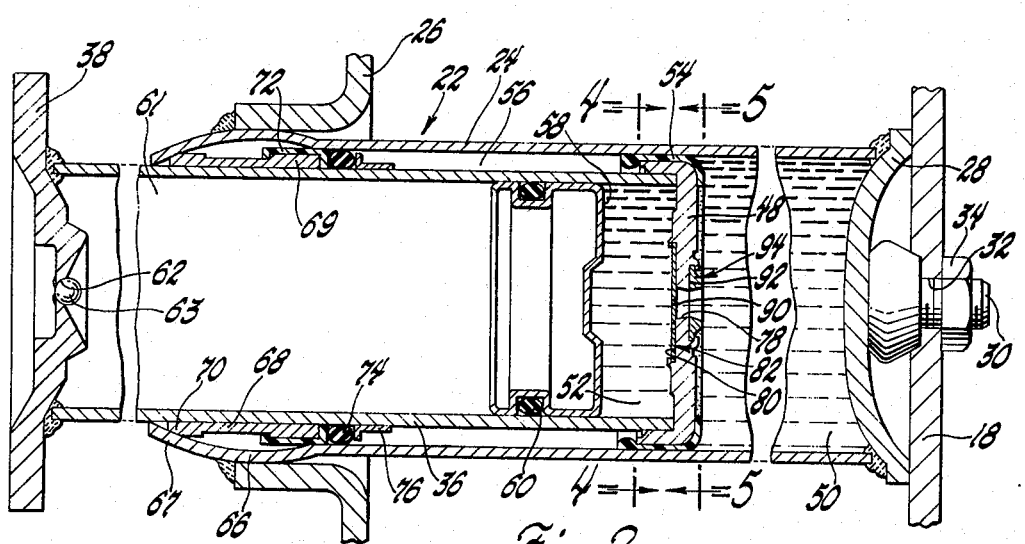
FIG. 2 is an enlarged sectional view taken generally along the plane indicated by lines 2—2 of FIG. 1 showing an energy absorber unit in its normal extended position.

The outer cylinder 24 is bulged at 66 to closely fit in the central opening through connector bracket 26 and has a terminal end wall 67 which is crimped or tapered inwardly after the cylinders 36 and 24 have been assembled together. A cylindrical steel bearing or stabilizing sleeve 68 is welded to the inner cylinder 36 and has at its forward extremity an enlarged tapered head portion 70 that closely engages the inside of the tapered end wall 67 to prevent radial play between the two cylinders in their extended position and to form a positive stop for the two cylinders in that position. As best shown in FIG. 2 and 3, the inner end of the bearing sleeve 68 has an enlarged end portion 69 that carries a bearing ring 72 of glass-filled nylon or other suitable material. An O-ring 74, mounted around the inner cylinder 36 and trapped between the end of the bearing ring 72 and a flanged collar 76 welded to the inner cylinder, slidably engages the inner wall of the outer cylinder 24 to hydraulically seal the space 56 to prevent oil leakage from space 56 to the exterior of the unit.

The cylinder cap 48 has a central conical opening 78 that increases in size as it leads inwardly from chamber 50 to provide a hydraulic passage between chambers 50 and 52. The inside face of cap 48 has an enlarged cylindrical relieved portion or recess 80 which receives an annular disc-like valve element 82. The valve element 82 is a spring metal member retained in the recess 80 by coining the peripheral edge of the recess over the outer edge of the valve element 82. As best shown in FIGS. 4 and 8, the valve element has a central flap 86 connected to the surrounding body of the valve element by spring hinge 88. Normally the spring hinge biases the flap 86 to a position coplanar with the body of the valve element but on the energy absorbing stroke, the flap 86 deflects as illustrated in FIG. 3 to permit the flow of hydraulic fluid from chamber 50 into chamber 52. After the unit is telescopically collapsed the spring hinge 88 biases the flap back to its coplanar position to cover the opening 78. A small centralized flow control orifice 90 in flap 86 operates to bleed fluid from chamber 50 into chamber 52 and control the rate of recovery or rebound of the unit after removal of the impact force.

In addition to the relieved portion 80, the cylinder cap 48 has a second cylindrical relieved portion or recess 92 centrally formed in its outer face. Secured in recess 92 is a fluid amplifying orifice element 94 shown best in FIG. 5, 6 and 7. The fluid amplifying orifice element 94 is generally cross shaped in plan view and has a central orifice 96 aligned with the central opening 78 in the cylinder cap 48. The fluid amplifying orifice element also has four radial fluid flow channels 100 on the inner side thereof leading from the dished peripheral edge portions 102 to the central orifice 96 providing a 360° fluid input into the central orifice when the inner cylinder telescopes into the outer cylinder in an energy absorbing stroke. The orifice element 94 is held in position by crimping the peripheral edge 104 of recess 92 over to trap the orifice element in place as best shown in FIGS. 2, 3 and 5. To provide an edge to shear the hydraulic fluid in chamber 58 on the energy absorbing stroke, the orifice 96 is formed with a predetermined taper 106 as best shown in FIG. 7.

The bumper assembly 46 will be moved inwardly in response to a directed and predetermined impact load applied thereto. As the cylinder 36 telescopes further into cylinder 24 in response to this impact load the pressure in chamber 50 becomes higher than the pressure in the chamber 52 and hydraulic fluid becomes higher than the pressure in the chamber 52 and hydraulic fluid will flow from the higher to the lower pressure chambers defecting flap 86 outwardly as shown in FIG. 3. This flow is controlled by the fluid amplifying valve element 94. A primary jet of oil will flow through the orifice 96 into the central opening 78. The flow leaving the orifice 96 is augmented by secondary flow through the radial flow channels 100 in the amplifying valve element 94 and will have a net momentum which is the sum of the momentum of the primary flow and that of the secondary or radial flow. This resultant flow is greater than the maximum flow which would be permitted through the central opening 78 by itself. Also, this resultant flow is an amplified or modulated flow in direct proportion to the velocity of the telescoping movement of the inner cylinder with respect to the outer cylinder. Thus, as energy is absorbed and velocity decreases, the resultant flow decreases so that a substantially constant pressure is maintained in the chamber 50 to provide a square wave energy absorption curve. If desired the amplifying orifice element may be designed to provide energy absorbing characteristics other than the "square" characteristic curve.

Assuming that the inner cylinder 36 has been telescoped to a point where the energy of the impact has been dissipated, the gas in the contracted chamber 61 compressed by piston 58 provides a spring force to return the cylinders to their extended position illustrated in FIGS. 1 and 2. Under such circumstances the hydraulic fluid in chamber 52 has a force exerted thereon by the gas biased piston 58. As this piston moves to the right quantities of hydraulic fluid are forced from contracting chamber 52 into expanding chamber 50 through the small orifice 90 in the closed flap 86. The metering of hydraulic fluid between the chambers through flap orifice 90 reduces the rate of recovery of the cylinders in moving from their telescoped FIG. 3 position to the extended FIG. 2 position.

Although the cylinders are telescopically mounted, stability for the necessary support of the bumper assembly 46 is provided by the stabilizing sleeve and the bearing sleeve so that there will be no excessive vibration of the bumper assembly during rough road operation and so that the vehicle can be effectively jacked or towed using the bumper assembly.

While a preferred embodiment of this invention has been shown and described to illustrate a preferred embodiment other embodiments will become apparent to those skilled in the art. Accordingly, the limits of this invention are defined in the following claims.

What is claimed is:

1. An impact energy absorbing unit for mounting a bumper assembly to a support on an automotive vehicle comprising: first and second cylinders, support means mounting said first cylinder for telescopic movement with respect to said second cylinder between an extended position and a retracted position, said first and second cylinders having cooperating stop means to establish the extended position of said cylinders, said first cylinder having cap means fixed at one end thereof and slidably disposed in said second cylinder to provide variable volume first and second fluid chambers in said unit, a hydraulic fluid in said first and second chambers, an opening through said cap hydraulically communicating said first and second chambers, a fluid amplifier supported by said cap having an orifice therethrough aligned with said opening in said cap, said fluid amplifier having channel means extending at an angle with respect to said orifice to direct fluid at a predetermined angle relative to the axis of said orifice to regulate the flow through said orifice in proportion to the velocity of the inner cylinder when telescoping into said outer cylinder in response to an impact load applied to the bumper assembly whereby the energy of the impact load is dissipated.

2. An impact energy absorbing unit for mounting a bumper assembly to a support on an automotive vehicle comprising: first and second cylinders, support means mounting said first cylinder for telescopic movement with respect to said second cylinder between an extended position and a retracted position, said first and second cylinders having cooperating stop means to establish the extended position of said cylinders, said first cylinder having cap means fixed at one end thereof and slidably disposed in said second cylinder to provide first and second fluid variable volume chambers in said unit, a hydraulic fluid in said chambers, a centralized opening in said cap hydraulically communicating said first and second chambers, a unitary fluid amplifying member supported by said cap having a central orifice aligned with said central opening of said cap, said fluid amplifier member having radial channel means extending at an angle with respect to said central orifice and providing passage means to direct hydraulic fluid at a predetermined angle relative to the axis of said orifice and said opening to control the flow of hydraulic fluid through said orifice from said first to said second chambers in proportion to the velocity of the first cylinder when telescoping into said second cylinder in response to an impact load applied to the bumper assembly so that the pressure in said first chamber remains at a substantially constant pressure substantially throughout the stroke of said first cylinder, and spring means for moving said first cylinder back to said extended position after removal of said impact load.

3. An impact energy absorbing unit for mounting a bumper assembly to a substantially rigid support on an automotive vehicle comprising first and second cylinders, support means mounting said first cylinder for telescoping movement with respect to said second cylinder between an extended position and a retracted position, said first and second cylinders having cooperating stop means to establish the extended position of said cylinders, spring means in said unit for urging said cylinders to said extended position, said first cylinder having a cap fixed to one end thereof and operatively disposed within said second cylinder to provide first and second hydraulic fluid chambers in said unit having a variable volume, a hydraulic fluid in said first and second chambers, an opening formed through said cap for hydraulically connecting said first and second chambers with each other, a fluid amplifier member supported by said cap having an orifice aligned with said opening in said cap, said fluid amplifier member having fluid channel means therein extending at an angle from said orifice to the periphery of said amplifier member to direct hydraulic fluid at a predetermined angle with respect to the axis of said orifice to regulate the flow of hydraulic fluid through said orifice in proportion to the velocity of the first cylinder telescoping into said cylinder in response to a predetermined impact load applied to said bumper assembly so that the energy of impact is dissipated, flap valve means for closing said opening in said cap subsequent to the absorption of the energy of impact, and fluid bleed means in said flap valve means for bleeding fluid from said second chamber to said first chamber to control the rate that said spring means moves said first cylinder back to said extended position after the impact load is removed.

4. An impact energy absorbing unit for mounting a bumper assembly to a substantially rigid support on an automotive vehicle comprising first and second cylinders, support means mounting said first cylinder for telescoping movement with respect to said second cylinder between an extended position and a retracted position, said first and second cylinders having cooperating stop means to establish the extended position of said cylinders, variable volume gas spring means in said unit for urging said cylinders to said extended position, said first cylinder having a cap fixed to one end thereof and operatively disposed within said second cylinder to provide first and second variable volume hydraulic fluid chambers in said unit, a hydraulic fluid in said first and second chambers, a centralized opening formed in said cap for hydraulically connecting said first and second chambers with each other, a unitary fluid amplifier supported on one side of said cap having central orifice aligned with said central opening in said cap, said fluid amplifier having radial channel means therein extending from the periphery of said central orifice to direct fluid into said orifice to control the flow of fluid through said orifice in proportion to the velocity of said first cylinder when telescoping into said second cylinder in response to a predetermined impact load applied to said bumper assembly so that pressure in said first cylinder is controlled and impact energy is dissipated at a predetermined rate, flap valve means supported on the other side of said cap for closing said opening when said gas spring means urges said first cylinder back toward said extended position, and bleed means in said flap valve means for bleeding hydraulic fluid from said second chamber back to said first chamber to thereby reduce the rate at which said first cylinder recovers to said extended position.

* * * * *